United States Patent
Totale et al.

(10) Patent No.: US 10,942,715 B2
(45) Date of Patent: *Mar. 9, 2021

(54) COMPOSABLE CONTEXT MENUS

(71) Applicant: Open Text Corporation, Waterloo (CA)

(72) Inventors: Sachin G. Totale, Pleasanton, CA (US); Deepak Michael, Bangalore (IN); Saif Ali Ansari, Namchi (IN); Shubha Ravi, Bangalore (IN)

(73) Assignee: OPEN TEXT CORPORATION, Waterloo (CA)

( * ) Notice: Subject to any disclaimer, the term of this patent is extended or adjusted under 35 U.S.C. 154(b) by 0 days.

This patent is subject to a terminal disclaimer.

(21) Appl. No.: 16/735,375

(22) Filed: Jan. 6, 2020

(65) Prior Publication Data
US 2020/0142673 A1    May 7, 2020

Related U.S. Application Data

(63) Continuation of application No. 14/842,713, filed on Sep. 1, 2015, now Pat. No. 10,540,150, which is a continuation of application No. 14/136,287, filed on Dec. 20, 2013, now Pat. No. 9,170,786.

(51) Int. Cl.
| | |
|---|---|
| *G06F 8/38* | (2018.01) |
| *G06F 9/451* | (2018.01) |
| *G06F 3/0482* | (2013.01) |
| *G06F 3/0484* | (2013.01) |

(52) U.S. Cl.
CPC .............. *G06F 8/38* (2013.01); *G06F 3/0482* (2013.01); *G06F 3/04845* (2013.01); *G06F 9/451* (2018.02)

(58) Field of Classification Search
None
See application file for complete search history.

(56) References Cited

U.S. PATENT DOCUMENTS

| | | |
|---|---|---|
| 4,910,660 A | 3/1990 | Li |
| 5,079,690 A | 1/1992 | Li |

(Continued)

OTHER PUBLICATIONS

U.S. Appl. No. 16/574,839, dated Jun. 22, 2020, 20 pgs.

(Continued)

*Primary Examiner* — Philip Wang
(74) *Attorney, Agent, or Firm* — Sprinkle IP Law Group

(57) ABSTRACT

A method includes automatically generating application code to implement a context menu in an application, the application code comprising code for providing a context menu container object as part of an application page when the application page is displayed by a browser, the context menu container object configured not to be visibly displayed as part of the application page, the context menu container object configured to hold a current set of context menu options during display of the application page, consume a first event during display of the application page, and evaluate logic based on the first event to update the current set of context menu options during display of the application page, the context menu container object responsive to a prescribed input to display the context menu as having the current set of context menu options.

20 Claims, 7 Drawing Sheets

(56) References Cited

U.S. PATENT DOCUMENTS

| | | | |
|---|---|---|---|
| 5,644,738 A * | 7/1997 | Goldman | G06F 3/0482 |
| | | | 715/825 |
| 5,754,772 A | 5/1998 | Leaf | |
| 6,012,067 A | 1/2000 | Sarkar | |
| 6,226,627 B1 | 5/2001 | Polak | |
| 6,233,726 B1 | 5/2001 | Bowman et al. | |
| 6,268,852 B1 | 7/2001 | Lindhorst | |
| 6,304,886 B1 | 10/2001 | Bernardo | |
| 6,397,220 B1 | 5/2002 | Deisinger | |
| 6,724,403 B1 | 4/2004 | Santoro | |
| 7,013,469 B2 | 3/2006 | Smith | |
| 7,225,425 B2 | 5/2007 | Kompalli et al. | |
| 7,734,995 B1 | 6/2010 | Salkaly | |
| 7,797,432 B2 | 9/2010 | Volodarsky et al. | |
| 7,933,632 B2 | 4/2011 | Flynt | |
| 8,156,481 B1 | 4/2012 | Koh et al. | |
| 8,271,899 B1 | 9/2012 | Blackburn et al. | |
| 8,321,681 B2 | 11/2012 | Tulchinsky et al. | |
| 8,346,889 B1 | 1/2013 | Chiu et al. | |
| 8,560,959 B2 | 10/2013 | Zaman | |
| 8,572,268 B2 | 10/2013 | Wray | |
| 8,645,848 B2 | 2/2014 | Lesh | |
| 9,170,786 B1 | 10/2015 | Totale | |
| 9,756,147 B1 | 9/2017 | Totale | |
| 9,851,951 B1 * | 12/2017 | Ganesan | G06F 8/30 |
| 9,977,703 B2 | 5/2018 | Gall | |
| 10,031,729 B1 * | 7/2018 | Totale | G06F 8/38 |
| 10,466,872 B1 * | 11/2019 | Totale | G06F 3/0484 |
| 10,540,150 B2 | 1/2020 | Totale | |
| 10,659,567 B2 | 5/2020 | Totale | |
| 2002/0194393 A1 | 12/2002 | Hrischuk et al. | |
| 2003/0004770 A1 | 1/2003 | Miller et al. | |
| 2003/0023641 A1 | 1/2003 | Gorman et al. | |
| 2003/0222906 A1 | 12/2003 | Fish et al. | |
| 2004/0006765 A1 | 1/2004 | Goldman et al. | |
| 2004/0044987 A1 | 3/2004 | Kompalli et al. | |
| 2005/0022157 A1 | 1/2005 | Brendle | |
| 2005/0114849 A1 | 5/2005 | Megiddo | |
| 2005/0149908 A1 | 7/2005 | Klianev | |
| 2005/0166207 A1 | 7/2005 | Baba et al. | |
| 2006/0053421 A1 | 3/2006 | Dickenson | |
| 2006/0074704 A1 | 4/2006 | Shukla et al. | |
| 2006/0074733 A1 | 4/2006 | Shukla et al. | |
| 2006/0236304 A1 | 10/2006 | Luo et al. | |
| 2006/0236306 A1 | 10/2006 | Debruin et al. | |
| 2006/0259586 A1 | 11/2006 | Wood | |
| 2007/0055591 A1 | 3/2007 | Enenkiel | |
| 2007/0266368 A1 | 11/2007 | Szpak et al. | |
| 2008/0046868 A1 | 2/2008 | Tsantilis | |
| 2008/0126396 A1 | 5/2008 | Gagnon | |
| 2008/0201332 A1 | 8/2008 | Souders | |
| 2008/0281944 A1 | 11/2008 | Vorne et al. | |
| 2009/0019386 A1 | 1/2009 | Sweetland et al. | |
| 2009/0055725 A1 | 2/2009 | Portnov | |
| 2009/0193339 A1 | 7/2009 | Nichols | |
| 2009/0210631 A1 * | 8/2009 | Bosworth | G06F 12/0875 |
| | | | 711/141 |
| 2009/0307670 A1 | 12/2009 | Kashyap et al. | |
| 2010/0058711 A1 | 3/2010 | Engel | |
| 2010/0211420 A1 | 8/2010 | Kodi et al. | |
| 2010/0281462 A1 | 11/2010 | Festa | |
| 2010/0293056 A1 | 11/2010 | Flynt | |
| 2011/0225565 A1 | 9/2011 | Van Velzen et al. | |
| 2011/0246549 A1 | 10/2011 | Katzenberger et al. | |
| 2012/0131442 A1 | 5/2012 | Grizim | |
| 2012/0166992 A1 * | 6/2012 | Huynh | H04L 67/10 |
| | | | 715/771 |
| 2013/0019172 A1 * | 1/2013 | Kotler | G06F 3/0488 |
| | | | 715/711 |
| 2013/0019182 A1 * | 1/2013 | Gil | G06F 3/0482 |
| | | | 715/738 |
| 2013/0151571 A1 | 6/2013 | Stumpf | |
| 2013/0205193 A1 | 8/2013 | Matsufuji et al. | |
| 2013/0218919 A1 | 8/2013 | Solonchev | |
| 2013/0219263 A1 | 8/2013 | Abrahami | |
| 2013/0290380 A1 | 10/2013 | Flickner et al. | |
| 2014/0013297 A1 | 1/2014 | Cook | |
| 2014/0052681 A1 | 2/2014 | Nitz | |
| 2014/0164906 A1 | 6/2014 | Hassler | |
| 2014/0201232 A1 | 7/2014 | Berry | |
| 2014/0245262 A1 | 8/2014 | Hill | |
| 2017/0359445 A1 | 12/2017 | Totale | |
| 2020/0012402 A1 | 1/2020 | Totale | |

OTHER PUBLICATIONS

The PHP Group, What is PHP?, Jan. 23, 2009, 1 pg., retrieved from https://web.archive.org/web/20090124160056/http://php.net/manual/en/intro-whatis.php.

Unknown, Kohana Team, Session Library, Jan. 2012, retrieved from http://www.hcs.harvard.edu/-powerpak/kohanadocs/libraries/session.html, 6 pgs.

Unknown, www.gwtproject.org. GWT, Jul. 2013, retrieved from https://web.archive.org/web/20130708095321/http://www.gwtproject.org/doc/latest/DevGuide-Html5Storage.html, 7 pgs.

Unknown, w3schools.com, "HTML5 Web Storage," Nov. 2012, retrieved from https://web.archive.org/web/20121123023047/http://www.w3schools.com/html/html5_webstorage.asp, 3 pgs.

Office Action for U.S. Appl. No. 14/136,287, dated Dec. 17, 2014, 10 pgs.

Office Action for U.S. Appl. No. 14/136,232, dated Sep. 11, 2015, 15 pgs.

Office Action for U.S. Appl. No. 14/136,255, dated Jan. 15, 2016, 16 pgs.

Office Action for U.S. Appl. No. 14/136,232, dated Feb. 1, 2016, 17 pgs.

Office Action for U.S. Appl. No. 14/136,255, dated Apr. 22, 2016, 16 pgs.

Office Action for U.S. Appl. No. 14/136,255, dated Jul. 12, 2016, 23 pgs.

Office Action for U.S. Appl. No. 14/136,232, dated Sep. 22, 2016, 18 pgs.

Office Action for U.S. Appl. No. 14/136,255, dated Oct. 17, 2016, 21 pgs.

Office Action for U.S. Appl. No. 14/136,255, dated Feb. 6, 2017, 21 pgs.

Office Action for U.S. Appl. No. 14/136,232, dated Mar. 10, 2017, 19 pgs.

Office Action for U.S. Appl. No. 14/136,232, dated Nov. 15, 2017, 20 pgs.

Office Action for U.S. Appl. No. 15/633,293, dated Feb. 20, 2018, 23 pgs.

Office Action for U.S. Appl. No. 14/842,713, dated Mar. 9, 2018, 43 pgs.

Office Action for U.S. Appl. No. 14/136,232, dated Jun. 11, 2018, 26 pgs.

Office Action for U.S. Appl. No. 14/136,232, dated Nov. 6, 2018, 21 pages.

Office Action for U.S. Appl. No. 15/633,293, dated Dec. 3, 2018, 19 pages.

Office Action for U.S. Appl. No. 15/633,293, dated Mar. 27, 2019, 14 pgs.

Office Action for U.S. Appl. No. 14/136,232, dated Apr. 12, 2019, 24 pgs.

Office Action for U.S. Appl. No. 15/633,293, dated Oct. 3, 2019, 16 pgs.

Notice of Allowance for U.S. Appl. No. 15/633,293, dated Jan. 15, 2020, 6 pgs.

U.S. Appl. No. 16/574,839, dated Oct. 28, 2020, 23 pgs.

\* cited by examiner

COMPOSABLE CONTEXT MENUS

CROSS REFERENCE TO OTHER APPLICATIONS

This application is a continuation of, and claims a benefit of priority under 35 U.S.C. 120 of the filing date of U.S. patent application Ser. No. 14/842,713 filed Sep. 1, 2015 entitled "COMPOSABLE CONTEXT MENUS", issued as U.S. Pat. No. 10,540,150, which is a continuation of U.S. patent application Ser. No. 14/136,287, issued as U.S. Pat. No. 9,170,786, entitled "COMPOSABLE CONTEXT MENUS" filed Dec. 20, 2013, the entire contents of which are hereby expressly incorporated by reference for all purposes.

BACKGROUND OF THE INVENTION

An application user interface, e.g., one accessed by a client system via a network using a browser or other software, may include one or more application pages. A page may include one or more widgets and/or other elements; one or more data sources (e.g., services); and/or one or more action flows or other business logic.

"Context" or "contextual" menus enable a user-selectable set of contextually-relevant options to be displayed in an application or other user interface. For example, if a user enters a "right click" or other prescribed input while a mouse of other cursor is "hovering" over an object displayed on an application page, a context menu comprising a list of actions considered to be potentially desired to be performed by the user with respect to the hovered-over object may be displayed. The set of options may be determined at least in part by application context data.

Software development tools enable developers, consultants, business analysts, etc. to create applications, including by designing the user interface pages of the application. Typically, the options available via such development tools to define context menus is limited to a predefined set designed and incorporated into the development tool by a provider of the tool.

BRIEF DESCRIPTION OF THE DRAWINGS

Various embodiments of the invention are disclosed in the following detailed description and the accompanying drawings.

DETAILED DESCRIPTION

Figure 1:
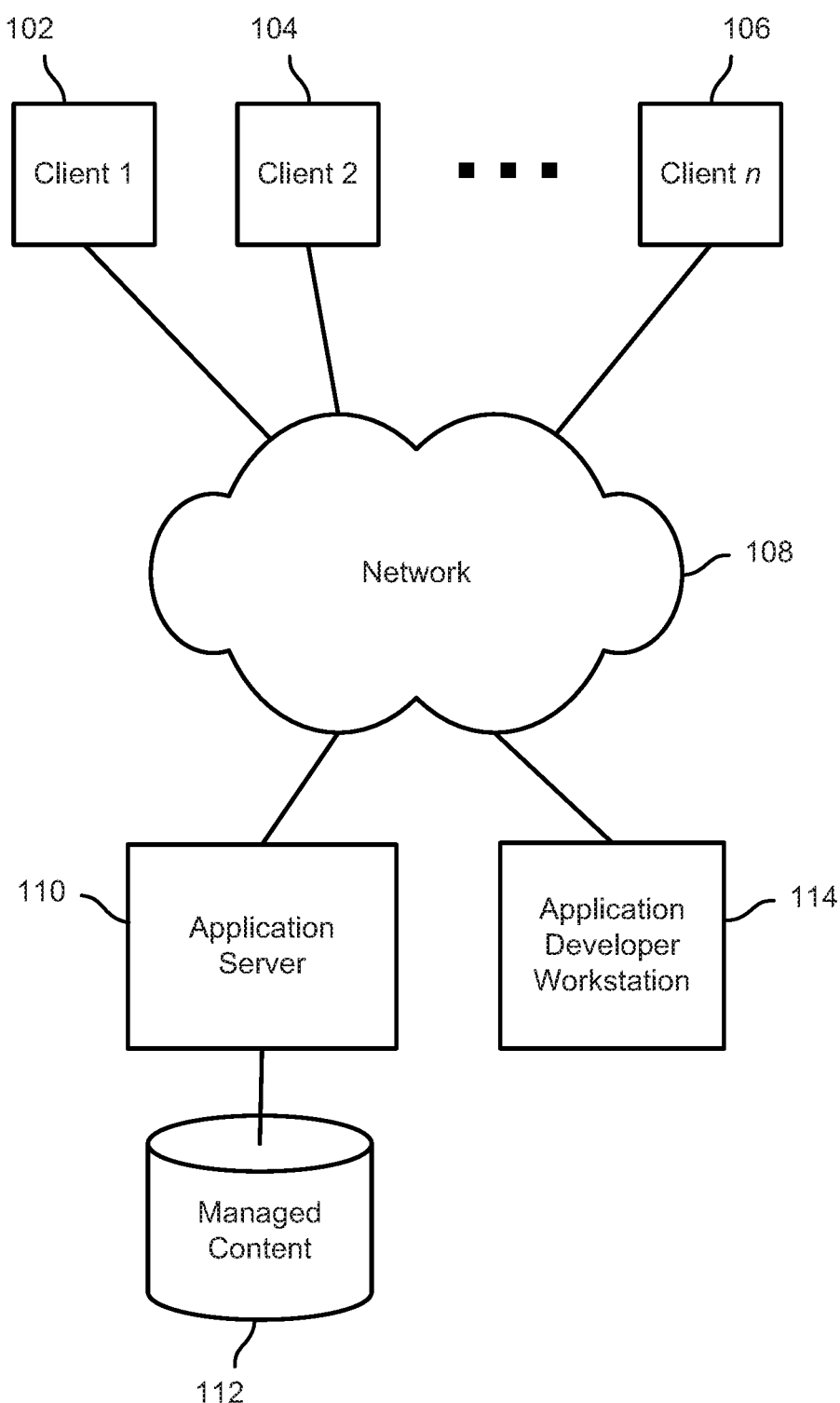
FIG. 1 is a block diagram illustrating an embodiment of an application development system and environment.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Composable context menus are disclosed. In various embodiments, a context menu definition is received, e.g., via a software development tool user interface. The definition may include a definition of one or more menu options. A menu option definition may specify processing to be performed at runtime, e.g., binding the menu option to a data service or other resource, evaluating an expression to determine whether and/or how to display the option, etc. In various embodiments, a context menu definition may specify an action to be performed upon selection of the option. The action definition may specify processing to be performed at runtime to determine one or more of an action to perform, a manner in which to perform the action, and a target or other destination of the action. For example, the definition may in some embodiments comprise an expression to be evaluated at runtime, using as an argument one or more of an application context data, an event payload, a value retrieved from a data service or other external resource, etc., to determine at runtime an action to perform and/or a target of the action. In some embodiments, an action defined to be taken in response to selection of a context menu option may include publishing an application user interface or other event. Action chaining is supported in some embodiments, including beyond the display life of a context menu. In some embodiments, an invisible widget and/or other container associated with a page provides at least part of the functionality of a composable context menu as disclosed herein.

FIG. 1 is a block diagram illustrating an embodiment of an application development system and environment. In the example shown, a plurality of client systems, representing in FIG. 1 by client systems 102, 104, and 106, connect via a network 108 to an application server 110 associated with a body of managed content 112. In some embodiments, the managed content 112 may be stored in a content management system, such as an EMC® Documentum® system. In various embodiments, a software developer or other user associated with application developer workstation 114, e.g., a personal or other computer, may use a software development tool to create an application to run on application server 110. For example, in some embodiments a developer may use the "xCP Designer" and/or other components comprising the EMC® Documentum® xCP development platform to create applications to run on application server 110, for example in a runtime environment provided on application server 110. The EMC® Documentum® xCP development platform, for example, enables a developer to use visual and other tools to build custom applications that leverage the advanced enterprise content management (ECM) capabilities of EMC® Documentum®.

In various embodiments, a visual or other development tool interface to enable developers to compose developer-composed context menu and associate such context menus with developer-designed application page and/or elements thereof is provided, e.g., via application development workstation 114. Definitions are received via the interface and stored. The definitions are used to generate application code which at runtime implements context menus as defined by the developer.

Figure 2:
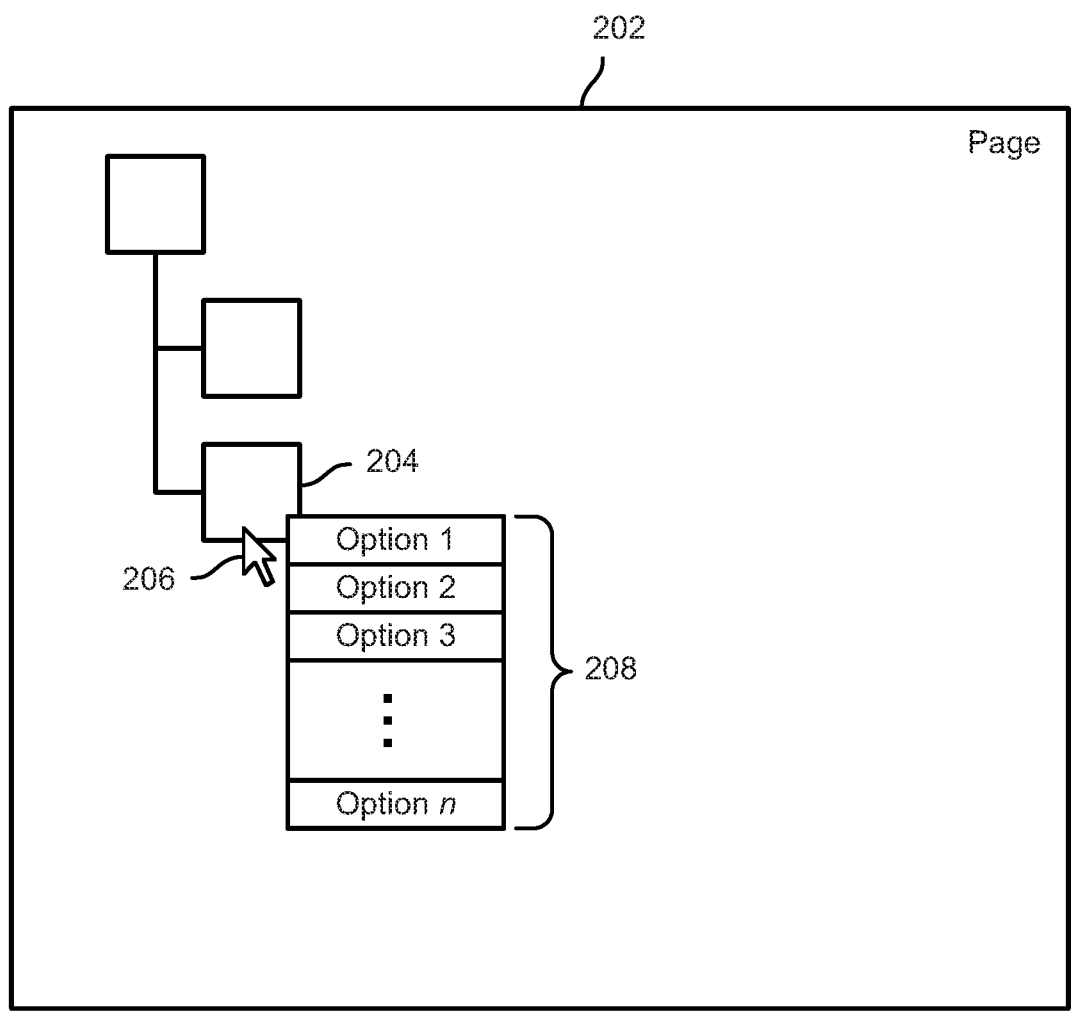
FIG. 2 is a block diagram illustrating an example of a context menu.

FIG. 2 is a block diagram illustrating an example of a context menu. In the example shown, the application page 202 includes a set of hierarchically-related objects, including object 204. The object 204 has been pre-selected, as indicated in this example by the position of the mouse (or other) cursor 206 in a location that overlaps the object 204 as displayed. For example, a user may have used a mouse, track pad, or other input device to move the cursor 206 to the position shown in FIG. 2. As a result, for example, of a right click or other input action by the user, a context menu 208 has been displayed. In the example shown, the menu includes a set of "n" menu options. As disclosed herein, in various embodiments an application page comprising an application created using a software development tool may be designed by the developer to include a context menu such as context menu 208 of FIG. 2. In various embodiments, a developer-composed context menu may include options as defined by the developer at design time. For example, one or more of the number, nature, and manner of display of the respective context menu options may be specified by the developer at design time. Application context variables, user interface event payloads, and/or other context data values may be used at runtime to determine which options to display and/or a manner in which to display them. For examples, in some embodiments the context menu definition may include an expression or other logic to be evaluated at runtime to determine which options to display and/or how. In some embodiments, expressions or other logic may be used, in connection with context data, to determine a responsive action to which to bind a context menu option. In some embodiments, the action may include publishing a user interface or other event, e.g., for consumption by other page and/or application components, and/or invoking a data service or other external service.

In some embodiments, chaining of actions may be supported and provided, including beyond an active display lifetime of the context menu. In various embodiments, a context menu comprises a page artifact that may be used across multiple application pages and/or fragments thereof, with the behavior exhibited with respect to each page being potentially different, e.g., as determined at runtime based on application, page, and/or other context data.

Figure 3:
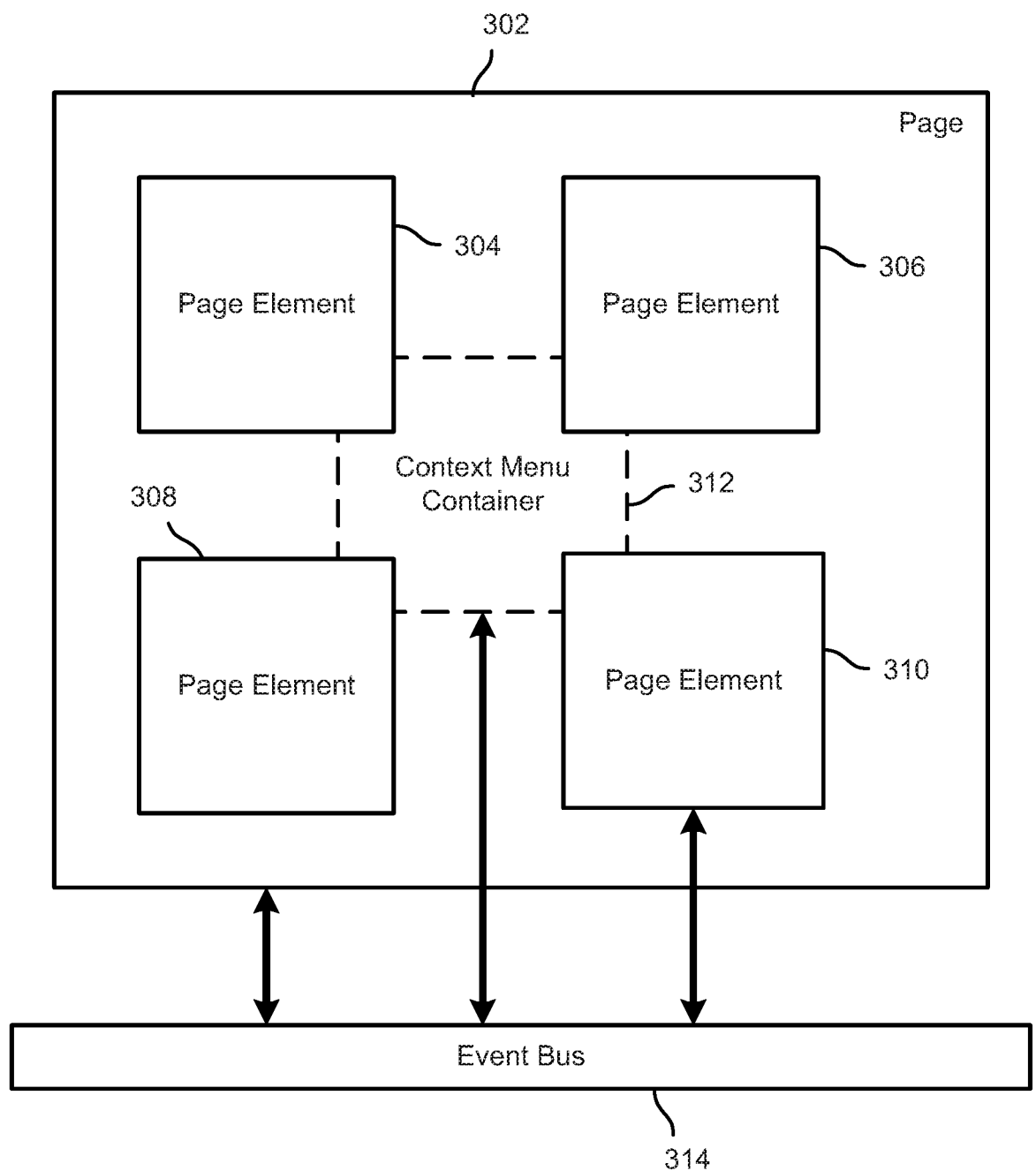
FIG. 3 is a block diagram illustrating an embodiment of a system to provide a context menu.

FIG. 3 is a block diagram illustrating an embodiment of a system to provide a context menu. In the example shown, an application page 302 includes a set of visibly displayed page elements (e.g., widgets, page fragments, etc.), represented in FIG. 3 by page elements 304, 306, 308, and 310. An at least initially not visibly displayed context menu container element 312 also is included as an object or other artifact comprising and/or otherwise associated with the page 302. In some embodiments, one or more invisible container, action, and/or other objects, such as content menu container 312, may be instantiated and included and/or otherwise associated with an application page. The invisible objects may be configured to perform such operations as holding context menu definitions, expressions, options, and/or other values; providing a binding or other association between a context menu and one or more data services and/or other external resources; binding context menu values to application context and/or other data values; evaluating expressions or other logic at runtime, e.g., at context menu display time, to determine one or more of a context menu option content and/or associated responsive actions; and/or binding context menu options to actions, such as action flows and services, associated with the application and/or page.

In the example shown in FIG. 3, the page 302, at least a subset of the page elements, e.g., page element 310, and a the context menu container object 312 have accessed to an application user interface and/or application page infrastructure, e.g., the event bus 314 shown in FIG. 3. In this way, the context menu container 312 and/or other context menu-associated objects and/or artifacts comprising page 302 may communicate with the page and/or elements thereof, for example by publishing an application user interface event in response to a user's interaction with an option include in a displayed context menu, for example.

In some embodiments, one or both the application user interface infrastructure, such as event bus 314, and invisible context menu-related objects such as context menu container 312 may be used to support action chaining, including in some embodiments beyond the time during which the context menu is displayed. In prior approaches, context menu related functionality may have disappeared once a context menu was no longer displayed. However, using techniques disclosed herein, in some embodiments action chaining may be facilitated by configuring an invisible context menu-related object to continue to maintain state, data service and/or action bindings, etc., even beyond the time during which the context menu is displayed. For example, a first action initiated by selection of a context menu option may upon completion trigger a second action associated with the context menu, even after the context menu is no longer being displayed.

Figure 4:
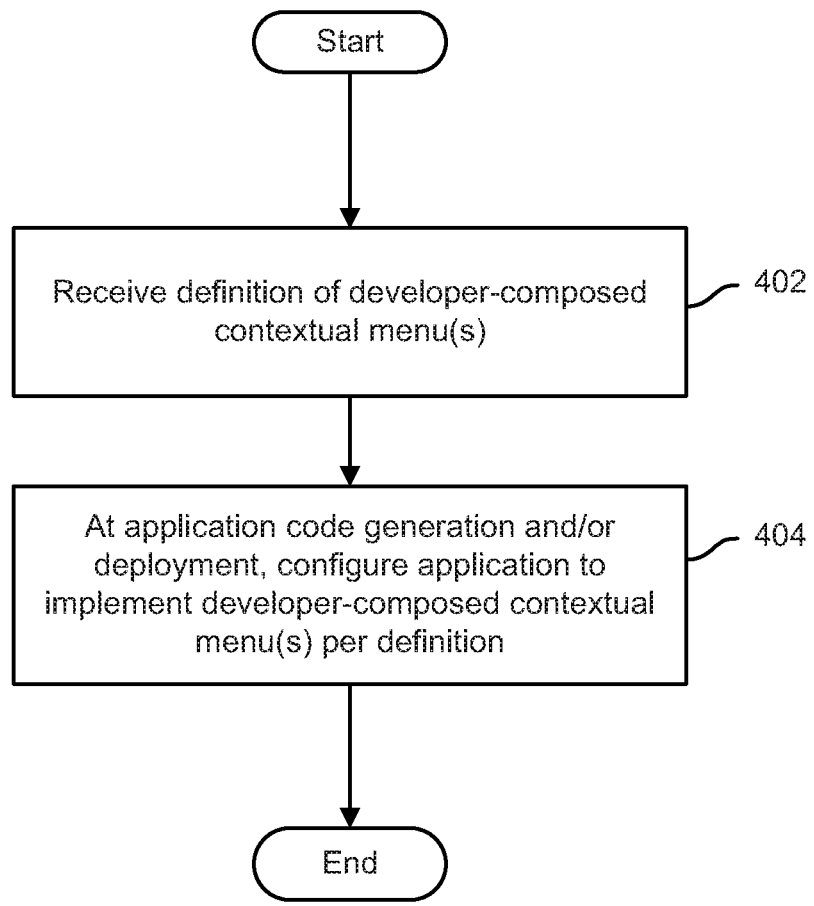
FIG. 4 is a flow chart illustrating an embodiment of a process to provide a developer-composed a context menu.

FIG. 4 is a flow chart illustrating an embodiment of a process to provide a developer-composed a context menu. In the example shown, a definition of developer-composed context menu is received (402), e.g., via a software development tool user interface. At application code generation and/or deployment time, application code to implement the context menu, as defined by the developer, is included in the application (404).

Figure 5:
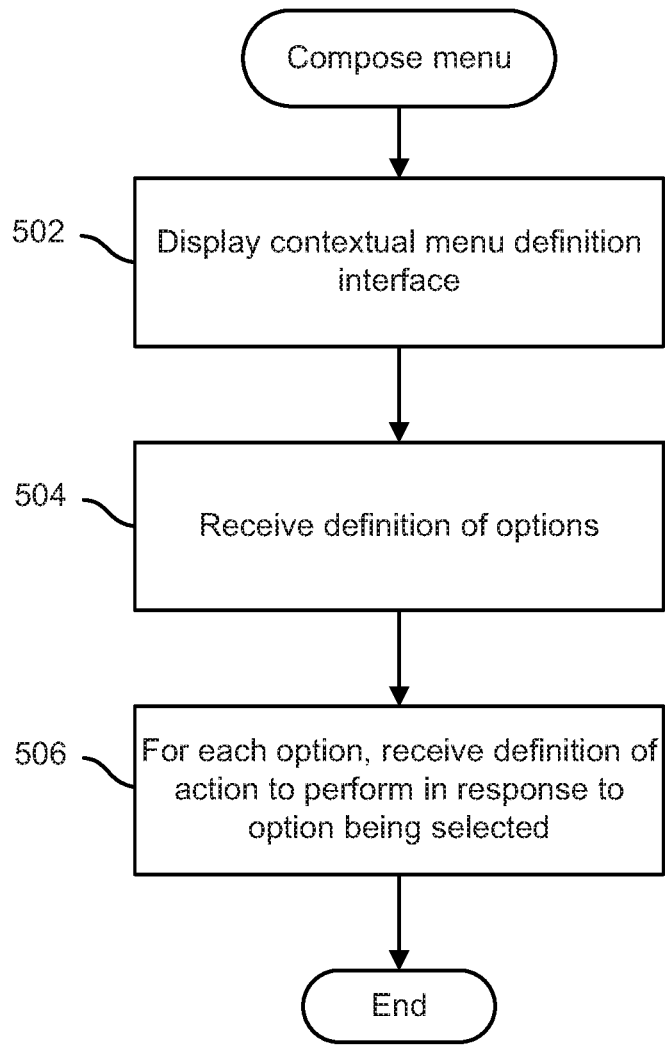
FIG. 5 is a flow chart illustrating an embodiment of a process to compose a context menu.

FIG. 5 is a flow chart illustrating an embodiment of a process to compose a context menu. In the example shown, a context menu definition interface is displayed (502). Examples include, without limitation, a software development tool interface. A definition of one or more options to be included in the context menu is received (504). For example, in some embodiments, one or more of a text input, an expression, and/or other definitions of one or more context menu options is received. In some embodiments, a definition may include expressions to be evaluated at runtime to determine a set of context menu options to provide, and/or a manner in which to display one or more options. For each of at least a subset of options, a definition of an action to perform in response to selection of that option is received (506). In some embodiments, an action may be specified using an expression to be evaluated at runtime. An application context data, an application session or other session parameter, user-associated data, etc., may be used to determine an action to take in response to the option being selected, a target of the action, etc. In some embodiments, an action may be defined to be taken in response to another action being completed and/or a result thereof received.

Figure 6:
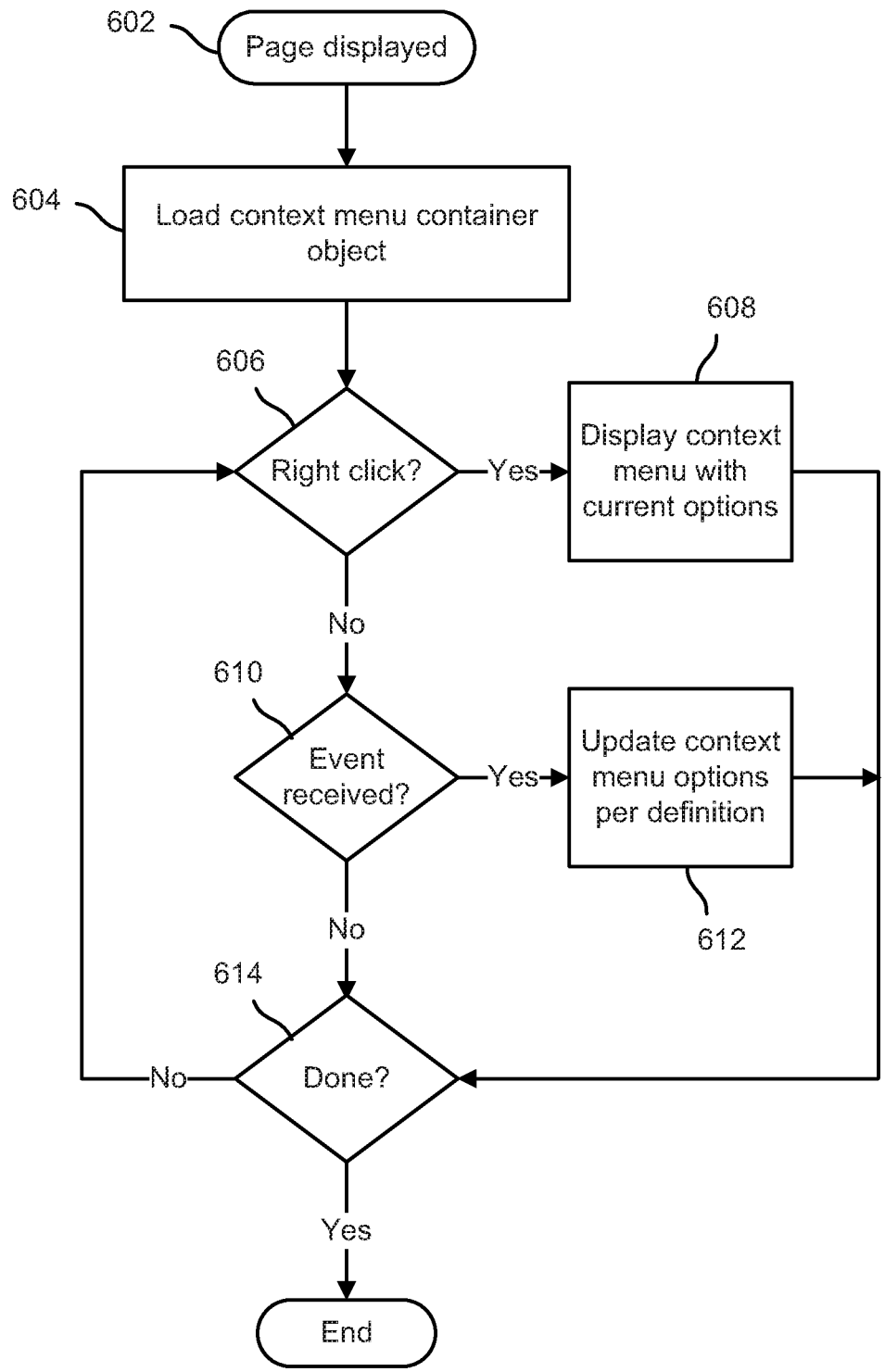
FIG. 6 is a flow chart illustrating an embodiment of a process to provide a developer-composed a context menu.

FIG. 6 is a flow chart illustrating an embodiment of a process to provide a developer-composed a context menu. When a page is displayed (602), a context menu container object is loaded (604). For example, an invisible application page widget or other page object or artifact may be loaded and initialized with a set of default values. If a right click or other prescribed input is received (606), the context menu container and/or other associated objects are used to display a context menu with options appropriate for the application and/or other context (608). If an event the content menu container object is configured to consume is received (610), one or more context menu options may be updated based on a payload of the event (612), even if the context menu is not currently being displayed. The next time the menu is displayed (608), the update values (e.g., menu options, action bindings, etc.) will be used. The process of updating context menu related values (e.g., in the background) in response to received events, changing values of application context or other context data, etc., continues until the need to provide developer-composed content menus for the application page ends, e.g., a different page is loaded or the user ends the application session (614).

Figure 7:
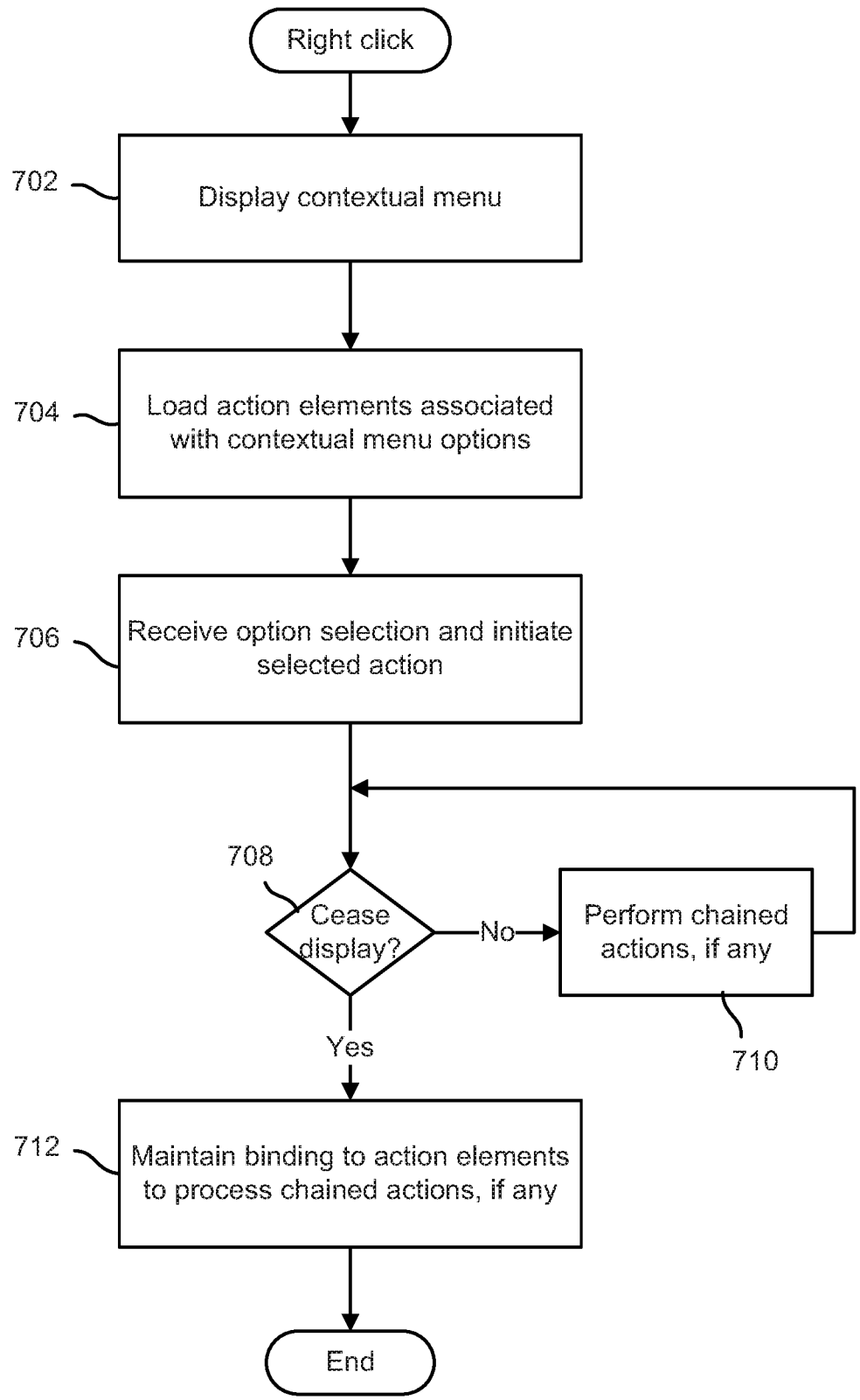
FIG. 7 is a flow chart illustrating an embodiment of a process to provide a developer-composed a context menu.

FIG. 7 is a flow chart illustrating an embodiment of a process to provide a developer-composed a context menu. In the example shown, a context menu is displayed (702). Action elements associated with the context menu are loaded (704). For example, a set of action elements may be associated with an invisible context menu container object comprising or otherwise associated with the application page. In some embodiments, action chaining is supported. User selection of a context menu option associated with a first action is received (706). Chained actions may be performed successive while the context menu remains displayed (708, 710); or, if the context menu display ends (e.g., times out), a binding to the action elements in the set is maintained (712), enabling subsequent actions in the chain to be performed even after the context menu is no longer displayed (708). In various embodiments, an invisible context menu associated object comprising the page is used to maintain action element or other bindings, including once the context menu is no longer displayed.

Using techniques described herein, developer-composed context menus may be defined and implemented. In various embodiments, menu options and/or associated actions may be defined by expressions or other logic to be evaluated at runtime, e.g., based on application context data. Actions may include publishing custom application user interface events and/or performing other actions.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A computer program product comprising a non-transitory computer readable medium storing therein a set of computer executable instructions, the set of computer executable instructions comprising instructions for:
   providing a context menu definition interface;
   receiving a context menu definition for a context menu based on user interaction with the context menu definition interface, the context menu definition comprising a context menu option definition, the context menu option definition comprising logic to be evaluated at runtime to determine context menu options to display; and
   including application code to implement the context menu in an application, based at least in part on the context menu option definition, the application code comprising code for providing a context menu container object as part of an application page when the application page is displayed by a browser, the context menu container object configured not to be visibly displayed as part of the application page, the context menu container object configured to hold a current set of context menu options during display of the application page, consume a first event during display of the application page, and evaluate the logic based on the first event to update the current set of context menu options during display of the application page, the context menu container object responsive to a prescribed input to display the context menu as having the current set of context menu options.

2. The computer program product of claim 1, wherein the application code comprises code for initializing the context menu container object with a default set of menu options as the current set of context menu options.

3. The computer program product of claim 1, wherein the context menu definition includes an action definition specifying an action associated with a first context menu option and wherein the context menu container object is configured to perform the action based on a user selection of the first context menu option in the context menu.

4. The computer program product of claim 1, wherein the context menu definition includes an action definition, the action definition comprising an expression to be evaluated at runtime to determine an action to perform upon selection of a first context menu option and wherein the context menu container object is configured to evaluate the expression to determine the action and bind the action to the first context menu option.

5. The computer program product of claim 4, wherein the expression includes a payload of the first event as an argument.

6. The computer program product of claim 4, wherein the expression includes an application context data as an argument.

7. The computer program product of claim 4, wherein the expression includes a value from a data source as an argument.

8. The computer program product of claim 4, wherein the action comprises publishing an application user interface.

9. The computer program product of claim 4, wherein the action comprises publishing a second event to an event bus.

10. The computer program product of claim 1, wherein the application code further comprises code for:
    providing a set of action elements associated with the context menu;
    receiving a selection of a first context menu option while the context menu is displayed;

performing chained actions while the context menu is displayed; and maintaining a binding to action elements in the set of action elements to continue processing of the chained actions after the context menu is no longer displayed.

11. A method comprising:

providing a context menu definition interface;

receiving a context menu definition for a context menu based on user interaction with the context menu definition interface, the context menu definition comprising a context menu option definition, the context menu option definition comprising logic to be evaluated at runtime to determine context menu options to display; and based at least in part on the context menu option definition, automatically generating application code to implement the context menu in an application, the application code comprising code for providing a context menu container object as part of an application page when the application page is displayed by a browser, the context menu container object configured not to be visibly displayed as part of the application page, the context menu container object configured to hold a current set of context menu options during display of the application page, consume a first event during display of the application page, and evaluate the logic based on the first event to update the current set of context menu options during display of the application page, the context menu container object responsive to a prescribed input to display the context menu as having the current set of context menu options.

12. The method of claim 11, wherein the application code comprises code for initializing the context menu container object with a default set of menu options as the current set of context menu options.

13. The method of claim 11, wherein the context menu definition includes an action definition specifying an action associated with a first context menu option and wherein the context menu container object is configured to perform the action based on a user selection of the first context menu option in the context menu.

14. The method of claim 11, wherein the context menu definition includes an action definition, the action definition comprising an expression to be evaluated at runtime to determine an action to perform upon selection of a first context menu option and wherein the context menu container object is configured to evaluate the expression to determine the action and bind the action to the first context menu option.

15. The method of claim 14, wherein the expression includes a payload of the first event as an argument.

16. The method of claim 14, wherein the expression includes an application context data as an argument.

17. The method of claim 14, wherein the expression includes a value from a data source as an argument.

18. The method of claim 14, wherein the action comprises publishing an application user interface.

19. The method of claim 14, wherein the action comprises publishing a second event to an event bus.

20. The method of claim 11, wherein the application code further comprises code for:

providing a set of action elements associated with the context menu;

receiving a selection of a first context menu option while the context menu is displayed;

performing chained actions while the context menu is displayed; and maintaining a binding to action elements in the set of action elements to continue processing of the chained actions after the context menu is no longer displayed.

* * * * *